US008812213B2

(12) United States Patent
Kanke

(10) Patent No.: US 8,812,213 B2
(45) Date of Patent: Aug. 19, 2014

(54) VEHICLE SPEED CONTROL APPARATUS

(75) Inventor: Masayasu Kanke, Kumagaya (JP)

(73) Assignee: Meidensha Corporation, Tokyo (JP)

( * ) Notice: Subject to any disclaimer, the term of this patent is extended or adjusted under 35 U.S.C. 154(b) by 1001 days.

(21) Appl. No.: 12/933,976

(22) PCT Filed: Mar. 4, 2009

(86) PCT No.: PCT/JP2009/054016
§ 371 (c)(1),
(2), (4) Date: Sep. 22, 2010

(87) PCT Pub. No.: WO2009/119263
PCT Pub. Date: Oct. 1, 2009

(65) Prior Publication Data
US 2011/0015847 A1    Jan. 20, 2011

(30) Foreign Application Priority Data
Mar. 25, 2008    (JP) .................................. 2008-077186

(51) Int. Cl.
    *B60T 8/32*    (2006.01)
(52) U.S. Cl.
    USPC .......................................................... 701/93
(58) Field of Classification Search
    USPC .................. 701/70, 93, 94, 96, 110; 180/170; 702/142; 303/177
    See application file for complete search history.

(56) References Cited

U.S. PATENT DOCUMENTS

| 4,939,657 A | * | 7/1990 | Imai et al. ........................ 701/95 |
| 5,532,929 A | * | 7/1996 | Hattori et al. ................. 701/110 |
| 5,625,558 A | * | 4/1997 | Togai et al. ...................... 701/93 |
| 6,282,465 B1 | * | 8/2001 | Nishijima et al. ................. 701/1 |
| 6,345,542 B1 | * | 2/2002 | Suzuki et al. ............... 73/862.09 |
| 6,560,522 B2 | * | 5/2003 | Katakura et al. ................. 701/54 |
| 6,741,923 B2 | * | 5/2004 | Katakura et al. .............. 701/101 |
| 6,763,295 B2 | * | 7/2004 | Katakura et al. ................ 701/70 |
| 6,873,896 B2 | * | 3/2005 | Maekawa et al. ............... 701/69 |
| 6,945,909 B2 | * | 9/2005 | Maekawa ....................... 477/175 |
| 6,970,787 B2 | * | 11/2005 | Matsumoto et al. .......... 701/301 |
| 7,010,408 B2 | * | 3/2006 | Kitazawa et al. ............... 701/70 |
| 7,016,803 B2 | * | 3/2006 | Kitazawa ...................... 702/142 |
| 7,027,904 B2 | * | 4/2006 | Ishizu et al. .................... 701/93 |
| 7,693,641 B2 | * | 4/2010 | Maruki ........................... 701/93 |
| 7,809,488 B2 | * | 10/2010 | Egawa et al. ................... 701/96 |

(Continued)

FOREIGN PATENT DOCUMENTS

| JP | 2002-014009 A | 1/2002 |
| JP | 2005-297872 A | 10/2005 |

*Primary Examiner* — Thomas Black
*Assistant Examiner* — Sze-Hon Kong
(74) *Attorney, Agent, or Firm* — Foley & Lardner LLP

(57) ABSTRACT

A vehicle speed control apparatus including a driving force characteristic map section configured to have a previously recorded driving force characteristic map, to input a target driving force and a target vehicle speed, and to output an accelerator opening angle in accordance with the driving force characteristic map, a vehicle sensitivity calculating section configured to calculate an inverse number of a vehicle sensitivity in accordance with the driving force characteristic map, a vehicle speed feedback section configured to input a vehicle speed deviation and the inverse number of the vehicle sensitivity and to output an accelerator opening angle according to the inverse number of the vehicle sensitivity, and an addition section configured to add the accelerator opening angle from the driving force characteristic map section to the accelerator opening angle from the vehicle speed feedback section to provide an accelerator opening angle command.

1 Claim, 6 Drawing Sheets

(56) References Cited

U.S. PATENT DOCUMENTS

| | | | |
|---|---|---|---|
| 7,844,382 B2 * | 11/2010 | Ogawa | 701/53 |
| 7,966,119 B2 * | 6/2011 | Sugano et al. | 701/96 |
| 2002/0033293 A1 * | 3/2002 | Fukuda et al. | 180/250 |
| 2002/0056583 A1 * | 5/2002 | Takano et al. | 180/197 |
| 2005/0234629 A1 * | 10/2005 | Maruki | 701/93 |

* cited by examiner

FIG.4

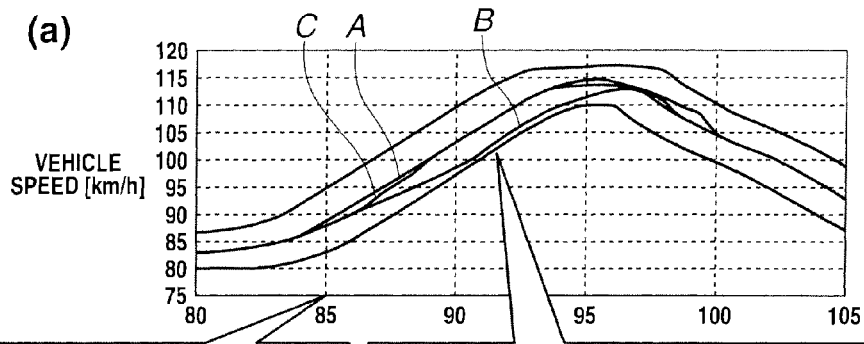

(a) Vehicle Speed [km/h] vs time, curves C, A, B

THE ACCELERATOR MANIPULATION IS SLOW IN ACTION EVEN THOUGH THE VEHICLE SPEED DEVIATION BECOMES LARGE IN THE CASE OF THE CONVENTIONAL CONTROL. HOWEVER, THE VEHICLE SPEED FOLLOWING CHARACTERISTIC IS FAVORABLE IN THE CASE OF THE NEW CONTROL.

SINCE THE TRANSMISSION IS UP-SHIFTED AT A TIME OF A STEADY STATE RUN, THE DRIVING FORCE BECOMES INSUFFICIENT AT AN OPENING ANGLE CALCULATED FROM THE DRIVING FORCE MAP. → IT IS NECESSARY TO HAVE THE FOLLOWING CHARACTERISTIC FOR A VEHICLE SPEED FEEDBACK ACCORDING TO THE PRESENT INVENTION (THE NEW CONTROL IS AT AN ADVANTAGE).

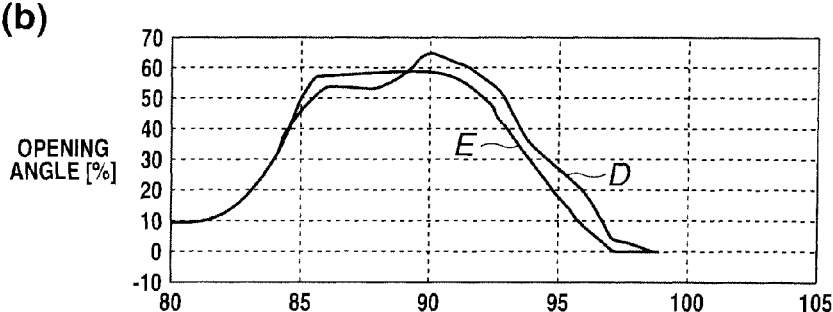

(b) Opening Angle [%] vs time, curves E, D

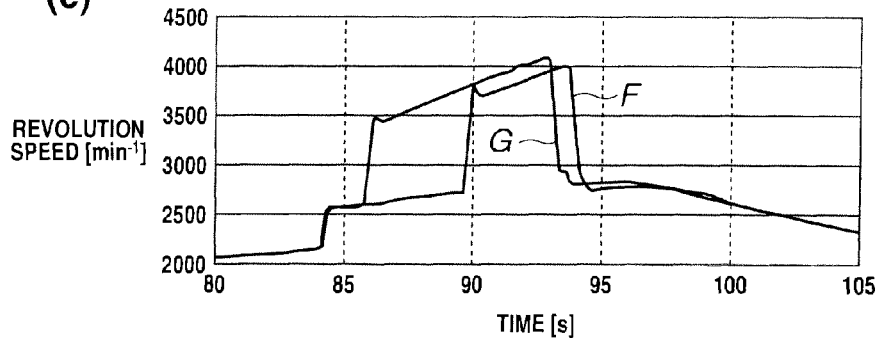

(c) Revolution Speed [min⁻¹] vs time, curves F, G

TIME [s]

VEHICLE SPEED CONTROL APPARATUS

TECHNICAL FIELD

The present invention relates to a vehicle speed control apparatus used when an engine is tested on an engine bench or a chassis dynamometer.

BACKGROUND ART

FIG. 5 shows a configuration of a vehicle speed control apparatus described in a Patent Document 1. In FIG. 5, a reference sign 1 denotes an acceleration force calculating section which calculates a command side acceleration force by a differential value of a vehicle speed command Vs×vehicle mass (a vehicle weight M). A running resistance is calculated in accordance with a detected vehicle speed V by means of a running resistance calculating section 2. The acceleration force and the running resistance are added at an addition section 3, then a driving force command F required for achieving a target driving mode is calculated.

This driving force command F is inputted to a feed-forward controller 4 (a driving force characteristic map, namely, a map in which a driving force characteristic is previously recorded before a mode pattern driving) together with the vehicle speed command Vs. The feed-forward controller 4 outputs an accelerator opening angle command $\theta_{FF}$ in accordance with the map.

In addition, an addition section 5 detects a deviation between the vehicle speed command Vs and an actual vehicle speed V. A vehicle speed deviation correction calculating section 6 performs a correction calculation of the vehicle speed deviation. Then, the corrected vehicle speed deviation and the driving force command F are added at an addition section 7. Further, a detection side acceleration force calculating section 8 calculates an acceleration force by a differential value of vehicle speed V×the vehicle mass. At an addition section 9, the acceleration force and the running resistance are added, then a driving force of the detection side is calculated.

An addition section 10 calculates a deviation between the driving force of the command side and the driving force of the detection side, and this deviation is inputted to a feedback controller 11. The feedback controller 11 outputs an accelerator opening angle command $\theta_{FB}$. An addition section 12 adds $\theta_{FF}$ and $\theta_{FB}$, then an accelerator opening angle command $\theta$ is obtained.

The accelerator opening angle command $\theta$ is inputted into a virtual vehicle 13. The virtual vehicle 13 generates an engine driving force required for the driving mode according to the accelerator opening angle command $\theta$. The virtual vehicle 13 is configured by a vehicular driving force characteristic section 14 including the engine, an addition section 15 and a vehicle speed calculating section 16. The addition section 15 subtracts the running resistance from the driving force that is generated from the driving force characteristic section 14, and the vehicle speed calculating section 16 calculates the vehicle speed.

FIG. 6 is a configuration in which a vehicle speed feedback gain correction by means of a weight (M) 17 is added to the vehicle speed deviation correction calculating section 6 in the vehicle speed control apparatus in FIG. 5.

[Patent document 1] a Japanese Patent Application Publication (tokkai) No. 2005-297872

DISCLOSURE OF THE INVENTION

Task to be Solved by the Invention

In the vehicle speed deviation correction calculating section 6 shown in FIGS. 5 and 6, a PI control, which is a general control technique with the vehicle speed deviation being an input and the accelerator opening angle being an output, is performed. In this PI control, a gain is a fixed gain (even if a vehicle speed feedback gain correction by the vehicle weight is added, once the vehicle is determined, it is a constant value). For a vehicle whose characteristic from the accelerator opening angle to the vehicle speed is nonlinear, there is nothing but to determine a gain that corresponds to a certain vehicle state.

Main factors of the nonlinearity of the vehicle are following. In the engine, the generated torque is not proportional to the accelerator opening angle, and the generated torque varies depending on the revolution speed of the engine. In addition, in a transmission, a gear ratio is selected according to the vehicle speed and a load (including a case of an automatic transmission). Furthermore, a deformation of vehicle tire also becomes the factor of the nonlinearity.

Hence, depending upon the vehicle state, the accelerator opening angle $\theta$ which is a manipulated variable becomes oversensitive and becomes slow in action. That is to say, under a low-speed, low-load state in which a vehicle sensitivity is high, the accelerator opening angle tends to become sensitive. On the other hand, under a high-speed, high-load state in which the vehicle sensitivity becomes low, although the accelerator opening angle should be operated by a large amount, its action is slow. Here, the sensitivity of the vehicle is defined as a variation $\Delta F$ of the driving force of the vehicle/a variation $\Delta\theta$ of the accelerator opening angle.

It is an object of the present invention to provide a vehicle speed control apparatus which is capable of making the accelerator operation slow in action under the low-speed, low-load state in which the vehicle sensitivity is high, namely, is capable of avoiding an oversensitive accelerator operation, also capable of enlarging an accelerator operation and of improving a vehicle speed following property by increasing a gain of a vehicle speed feedback under the high-speed, high-load state in which the vehicle sensitivity is low.

Means for Solving the Task

The vehicle speed control apparatus according to claim 1, comprising: a driving force characteristic map section configured to have a previously recorded driving force characteristic map, to input a target driving force and a target vehicle speed, and to output an accelerator opening angle in accordance with the driving force characteristic map; a vehicle sensitivity calculating section configured to calculate an inverse number of a vehicle sensitivity in accordance with the driving force characteristic map; a vehicle speed feedback section configured to input a vehicle speed deviation and the inverse number of the vehicle sensitivity and to output an accelerator opening angle according to the inverse number of the vehicle sensitivity; an addition section configured to add the accelerator opening angle from the driving force characteristic map section to the accelerator opening angle from the vehicle speed feedback section to provide an accelerator opening angle command; and means for varying the accelerator opening angle according to the accelerator opening angle command from the addition section to make the vehicle speed coincident with the target vehicle speed.

The vehicle speed control apparatus according to claim 2, wherein the vehicle speed control apparatus further comprises means for holding, in a case where the inverse number of the vehicle sensitivity abruptly becomes small, the inverse number of the vehicle sensitivity with this value of the inverse number set to be large as it is for a certain time.

Effect of the Invention

According to claim 1 of the present invention, an accelerator opening angle which is the output from the driving force characteristic map section is corrected by an accelerator opening angle according to the inverse number of the vehicle sensitivity which is the output of the vehicle speed feedback section. Under the low-speed, low-load state in which the vehicle sensitivity is high, the gain of the vehicle speed feedback section is low, and an accelerator manipulation becomes slow in action, then an excessive accelerator manipulation can be avoided. In addition, under the high-speed, high-load state in which the vehicle sensitivity is low, the gain of the vehicle speed feedback section is high, then the vehicle speed following property can become excellent.

In addition, according to claim 2, the vehicle speed control apparatus further comprises means for holding, in a case where the inverse number of the vehicle sensitivity from the vehicle sensitivity calculating section abruptly becomes small, the inverse number of the vehicle sensitivity with this value set to be large as it is for a certain time. If the inverse number of the vehicle sensitivity abruptly becomes small such that the state changes from an acceleration to a steady state, the inverse number of the vehicle sensitivity is held with this value set to be large as it is for the certain time, so that the reduction of the gain calculated on the basis of this held value can be suppressed and a convergence property of the deviation can be improved.

BEST MODE FOR CARRYING OUT THE INVENTION

In the following, the best mode for carrying out the present invention will be explained with reference to drawings. First, a basic configuration according to the best mode for carrying out the present invention will be explained with reference to FIG. 1. In FIG. 1, a reference sign 18 denotes a vehicle sensitivity calculating section that calculates an inverse number of a vehicle sensitivity (driving force variation $\Delta F$/accelerator opening angle variation $\Delta\theta$) in accordance with a driving force characteristic map. A reference sign 19 denotes a proportional calculating section that inputs the vehicle speed deviation and the inverse number of the vehicle sensitivity and multiplies a proportional gain by these values. A reference sign 20 denotes an integration calculating section that calculates an integration of an output of the proportional calculating section 19. A reference sign 21 is an addition section that adds the output of the proportional calculating section 19 and an output of the integration calculating section 20. A vehicle feedback section 22 is formed by the proportional calculating section 19, the integration calculating section 20 and the addition section 21. An output of the vehicle feedback section 22 is an accelerator opening angle.

On the other hand, a reference sign 23 denotes a driving force characteristic map section. The driving force characteristic map section 23 inputs a target driving force and a target vehicle speed then outputs an accelerator opening angle by a previously recorded driving force characteristic map. The driving force characteristic map is a characteristic map that indicates a relationship of three of the vehicle speed, the driving force and the accelerator opening angle, as shown in FIG. 3. This accelerator opening angle and the accelerator opening angle that is the output of the vehicle speed feedback section 22 are added at an addition section 24, then becomes an accelerator command.

The accelerator command is inputted into a vehicle 39, and the accelerator opening angle of vehicle 39 is operated. The vehicle 39 then generates an engine driving force required for a driving mode in accordance with the accelerator opening angle by this operation. The vehicle 39 is formed by a vehicle (an engine+a drive-train) 25, an addition section 26 and a vehicle (inertia) 27. In the vehicle 39, the addition section 26 subtracts a running resistance of a chassis dynamometer from a driving force generated by the vehicle 25, then an acceleration force is obtained. A vehicle speed is therefore developed from the vehicle 27. An input-and-output characteristic of the vehicle 25 is the sensitivity of the vehicle.

In the above-described basic configuration, the vehicle characteristic is cancelled by the sensitivity of the vehicle on the chassis dynamometer and the inverse number of the vehicle sensitivity calculated by the vehicle sensitivity calculating section 18, and a linearization of the system is performed, then a response of a vehicle speed feedback can be determined by the vehicle weight and coefficients of the proportional and integration (PI). If also the determination of the coefficients of PI is made according to the vehicle weight, the response of the vehicle speed feedback section 22 can be constant. A specific operation of the controller is in the following.

(1) Under the low-speed, low-load state in which the sensitivity of the vehicle is high, the gain of vehicle speed feedback section 22 is low, and the accelerator manipulation becomes slow in action, then the excessive accelerator manipulation can be avoided.

(2) Under the high-speed, high-load state in which the sensitivity of the vehicle is low, the gain of vehicle speed feedback section 22 is high, and the vehicle speed following property can become excellent.

(3) A linear control theory can be applied to a control design of the vehicle speed.

FIGS. 2(a) and 2(b) show detailed configurations of the vehicle sensitivity calculating section 18 and the vehicle speed feedback section 22 according to the best mode for carrying out the present invention. In the vehicle sensitivity calculating section 18 shown in FIG. 2(a), the command side acceleration force calculating section 1 inputs a vehicle speed command and calculates an acceleration force. Further, at the addition section 3, the running resistance is added to the acceleration force, a demanded driving force is then obtained.

A driving force characteristic section 28 has the previously recorded driving force characteristic map of the relationship of three of the vehicle speed, the driving force and the accelerator opening angle. The driving force characteristic section 28 inputs the vehicle speed command and the demanded driving force, and outputs an accelerator opening angle.

Further, at an addition section 29, the driving force variation $\Delta F$ which is a small fixed value for a scale of the driving force and the demanded driving force are added, and this addition value is inputted to a driving force characteristic section 30 together with the vehicle speed command Vs.

The driving force characteristic section 30 also has the same driving force characteristic map as the driving force characteristic section 28, and outputs an accelerator opening angle. An addition section 31 subtracts the accelerator opening angle outputted from the driving force characteristic section 28 from the accelerator opening angle outputted from the driving force characteristic section 30, then the accelerator opening angle variation Δθ can be obtained. The accelerator opening angle variation Δθ and the driving force variation ΔF are inputted to a calculating section 32, and the inverse number Δθ/ΔF of the vehicle sensitivity is calculated.

A limiter 33 provides a limitation in order for Δθ/ΔF to be equal to or larger than zero. A peak hold circuit 34 holds, in a case where the inverse number of the vehicle sensitivity abruptly becomes small such that the state changes from an acceleration to a steady state, the inverse number of the vehicle sensitivity with this value set to be large as it is for a certain time, then a reduction of the gain calculated on the basis of this held value can be suppressed and a convergence property of the deviation can be improved.

Next, a multiplication section 35 in FIG. 2(b) inputs the vehicle speed deviation and an output X·1 of the peak hold circuit 34, and performs multiplication of these values, then outputs it to the proportional calculating section 19. Further, an output of the proportional calculating section 19 is integrated in integration calculating section 20. An addition section 38 adds the output of the proportional calculating section 19 and an output of the integration calculating section 20, then this becomes an accelerator opening angle output of the vehicle feedback section 22. This accelerator opening angle output is added to the accelerator opening angle that is the output of driving force characteristic map section 23 at the addition section 24 in FIG. 1, then the accelerator opening angle command is provided. Subsequent control operation is the same as FIG. 1.

With respect to a manner of determining a parameter of the proportional calculating section 19 and a parameter of the integration calculating section 20, a linear control design theory of a speed control system, in which the inertia (here, the vehicle weight) is an object of the control, could be employed. For example, when performing the control so that a pole of a control loop becomes a real number root (i.e. so that the response does not oscillate) with a response time set as T(s) and with the vehicle weight set as M(kg), the following manner of determining the parameter can be applied. That is to say, for example, the proportional gain of the proportional calculating section 19 is M/T, and an integration gain of the integration calculating section 20 is ¼ T.

FIG. 4(a) shows a relationship between time and vehicle speed. In FIG. 4(a), A denotes a command value, B denotes a controlled vehicle speed before the improvement, and C denotes the controlled vehicle speed after the improvement. Since the transmission gear ratio is up-shifted during a steady running before the improvement, the driving force according to the accelerator opening angle calculated from the driving force map becomes insufficient, thus the following property of the vehicle speed feedback is required. In addition, before the improvement, in spite of the fact that the deviation of the vehicle speed becomes large, the accelerator operation is slow in action. After the improvement, the vehicle speed following property becomes improved. In addition, FIG. 4(b) shows a relationship between time and the opening angle, FIG. 4(c) shows a relationship between time and a revolution speed. D and F denote the opening angle and the revolution speed before the improvement. E and G denote the opening angle and the revolution speed after the improvement.

As explained above, according to the best preferred embodiment, under the low-speed, low-load state in which the sensitivity of the vehicle is high, the gain of vehicle speed feedback section 22 is low, and the accelerator manipulation becomes slow in action, then the excessive accelerator manipulation can be avoided. Further, under the high-speed, high-load state in which the sensitivity of the vehicle is low, the gain of vehicle speed feedback section 22 is high, and the vehicle speed following property can become excellent. Moreover, in the control design of the vehicle speed, the linear control theory can be applied. Additionally, the peak hold circuit 34 holds, in the case where the inverse number of the vehicle sensitivity abruptly becomes small such that the state changes from the acceleration to the steady state, the inverse number of the vehicle sensitivity with this value set to be large as it is for the certain time, then the reduction of the gain calculated on the basis of this held value can be suppressed and the convergence property of the deviation can be improved.

BRIEF DESCRIPTION OF THE DRAWINGS

FIGS. 4(a) to 4(c) characteristic graphs representing effects of the present invention.

EXPLANATION OF SIGNS

Figure 1:
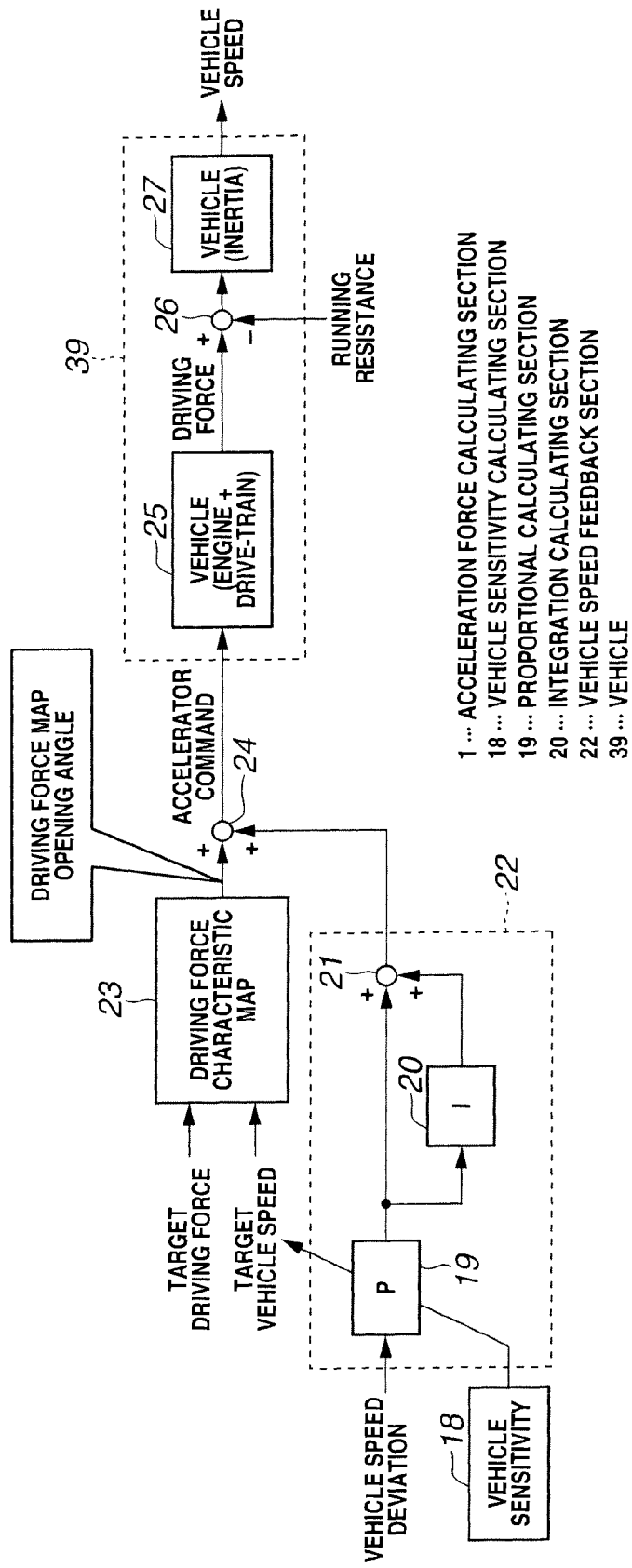
FIG. 1 a basic structural drawing according to a best preferred embodiment of the present invention.
Figure 2:
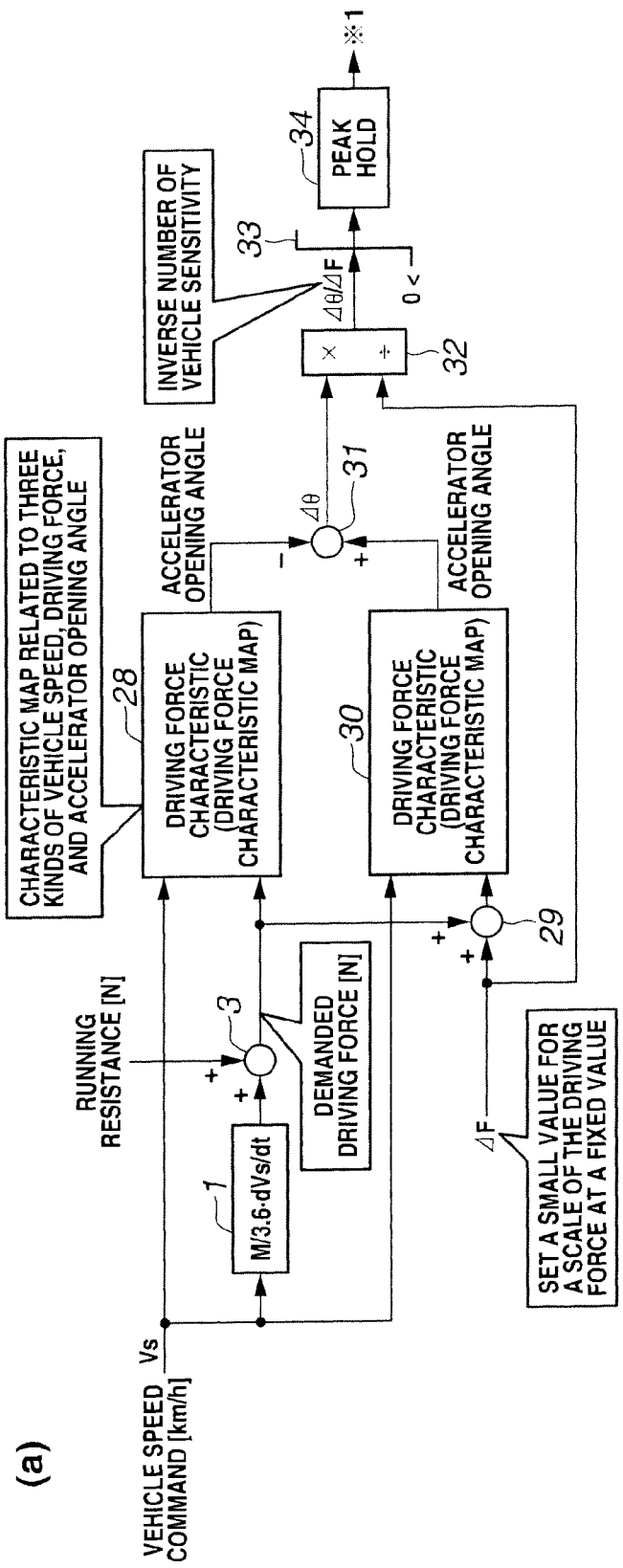
FIGS. 2(a), 2(b) structural drawings of a vehicle sensitivity calculating section and a vehicle speed feedback section in a specific best preferred embodiment according to the present invention.
Figure 3:
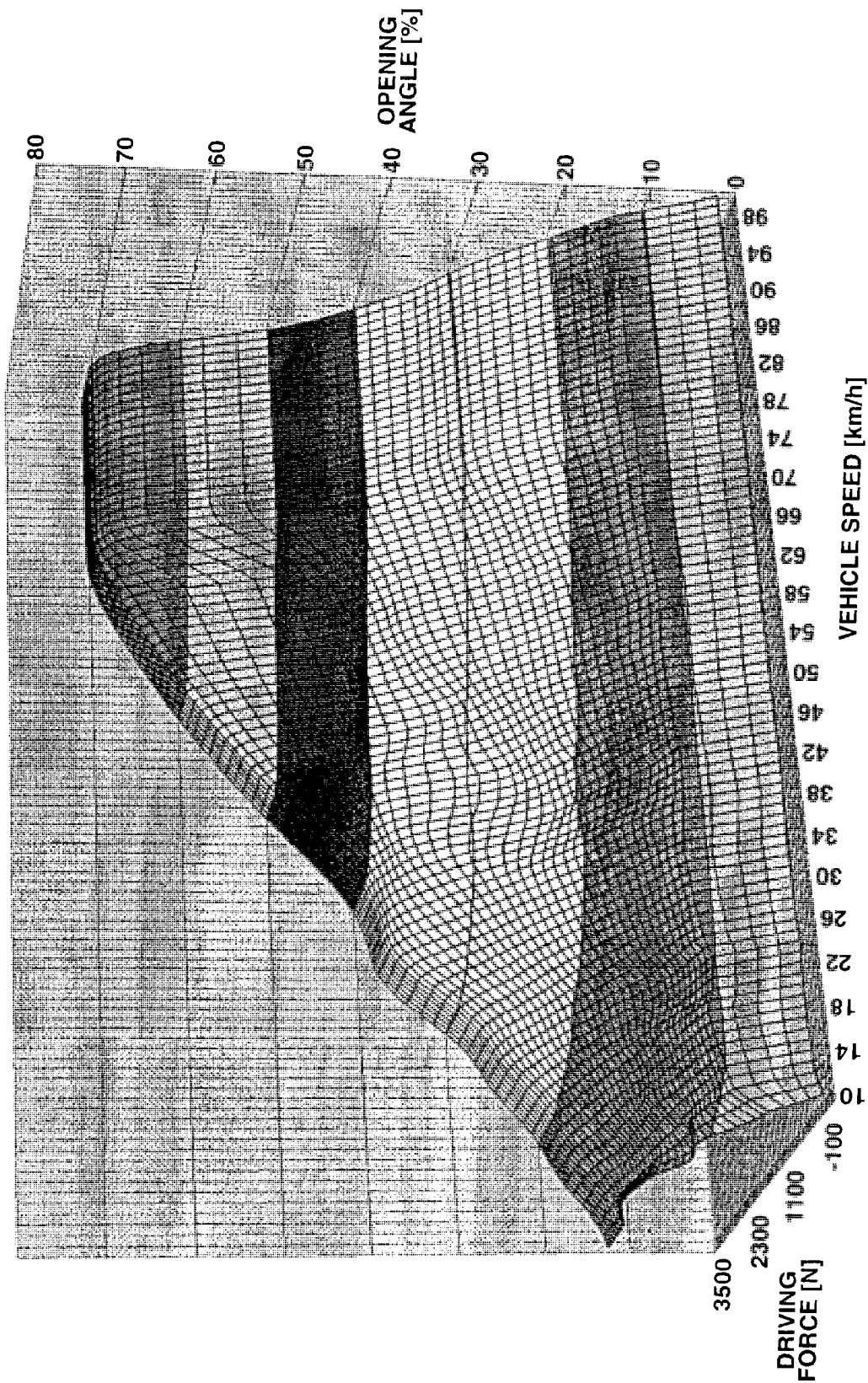
FIG. 3 a driving force characteristic map according to the present invention.
Figure 5:
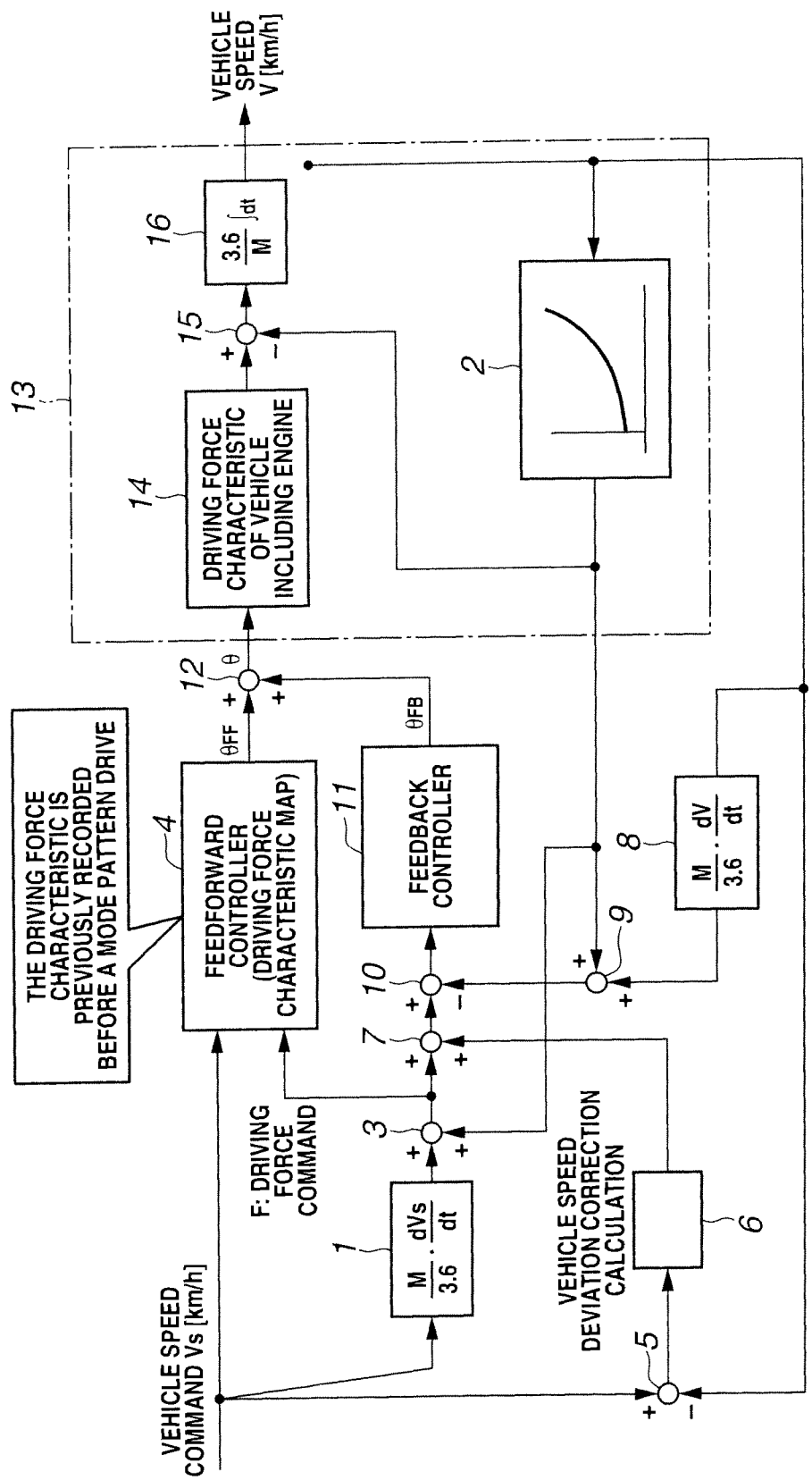
FIG. 5 a conventional vehicle speed control apparatus described in patent document 1.
Figure 6:
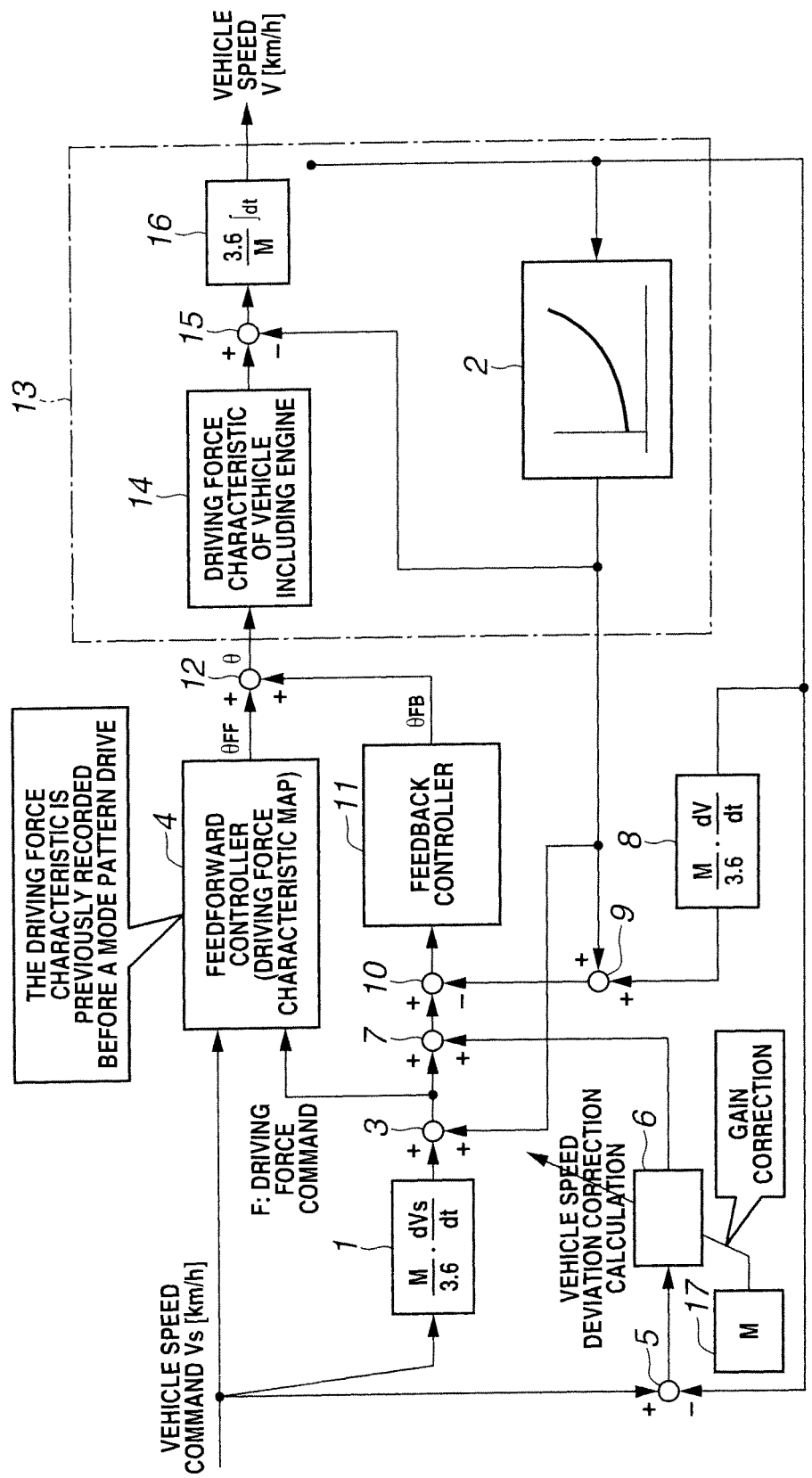
FIG. 6 another conventional vehicle speed control apparatus.

1 . . . acceleration force calculating section
18 . . . vehicle sensitivity calculating section
19 . . . proportional calculating section
20 . . . integration calculating section
22 . . . vehicle speed feedback section
23 . . . driving force characteristic map section
33 . . . limiter
34 . . . peak hold
39 . . . vehicle

What is claimed is:

1. A vehicle speed control apparatus, comprising:
a driving force characteristic map section configured to have a previously recorded driving force characteristic map, to input a target driving force and a target vehicle speed, and to output an accelerator opening angle in accordance with the driving force characteristic map;
a vehicle sensitivity calculating section configured to calculate an inverse number of a vehicle sensitivity in accordance with the driving force characteristic map;
a vehicle speed feedback section configured to input a vehicle speed deviation and the inverse number of the vehicle sensitivity and to output an accelerator opening angle according to the inverse number of the vehicle sensitivity;
an addition section configured to add the accelerator opening angle from the driving force characteristic map section to the accelerator opening angle from the vehicle speed feedback section to provide an accelerator opening angle command;
means for varying the accelerator opening angle according to the accelerator opening angle command from the addition section to make the vehicle speed coincident with the target vehicle speed; and
means for holding, in a case where the inverse number of the vehicle sensitivity abruptly becomes small, the inverse number of the vehicle sensitivity with this value of the inverse number set to be large as it is for a certain time.

* * * * *